(12) United States Patent
Dadyala

(10) Patent No.: US 9,457,917 B2
(45) Date of Patent: Oct. 4, 2016

(54) AIRPORT BAGGAGE HANDLING SYSTEM

(71) Applicant: Vanderlande Industries, B.V., Veghel (NL)

(72) Inventor: Gaylloyd Frank Dadyala, Kennesaw, GA (US)

(73) Assignee: Vanderlande Industries, B.V. (NL)

( * ) Notice: Subject to any disclaimer, the term of this patent is extended or adjusted under 35 U.S.C. 154(b) by 88 days.

(21) Appl. No.: 14/305,463

(22) Filed: Jun. 16, 2014

(65) Prior Publication Data

US 2015/0360258 A1 Dec. 17, 2015

(51) Int. Cl.
*G06K 5/00* (2006.01)
*B64F 1/36* (2006.01)

(52) U.S. Cl.
CPC ....................... *B64F 1/368* (2013.01)

(58) Field of Classification Search
CPC ............. G06K 9/00771; G06K 2209/09; G06K 9/3241; G06K 9/56; G06K 9/6211; G06Q 10/02
USPC ................. 235/375, 382, 384, 492; 378/57
See application file for complete search history.

(56) References Cited

U.S. PATENT DOCUMENTS

| 5,600,303 | A | | 2/1997 | Husseiny et al. | |
|---|---|---|---|---|---|
| 5,642,393 | A | * | 6/1997 | Krug | G01V 5/0016 376/159 |
| 6,026,143 | A | * | 2/2000 | Simanovsky | G06K 9/00771 378/15 |
| 6,994,262 | B1 | * | 2/2006 | Warther | G06K 19/06018 235/492 |
| 7,116,751 | B2 | | 10/2006 | Ellenbogen et al. | |
| 7,324,625 | B2 | | 1/2008 | Eilbert | |
| 7,353,955 | B2 | * | 4/2008 | Edwards | B64F 1/32 198/348 |
| 7,440,544 | B2 | | 10/2008 | Scheinman et al. | |
| 7,575,112 | B2 | * | 8/2009 | Lowes | B64F 1/368 198/349 |
| 7,699,158 | B2 | | 4/2010 | Aust et al. | |
| 7,702,068 | B2 | | 4/2010 | Scheinman et al. | |
| 8,031,903 | B2 | * | 10/2011 | Paresi | G01V 5/0083 340/572.1 |
| 8,074,807 | B2 | * | 12/2011 | Koren | B64F 1/368 209/559 |
| 8,165,267 | B2 | * | 4/2012 | Henkel | G01V 5/0008 378/4 |
| 8,320,659 | B2 | | 11/2012 | Song et al. | |
| 8,766,764 | B2 | * | 7/2014 | Rayner | G05B 15/02 340/1.1 |
| 2003/0225612 | A1 | | 12/2003 | DeSimone et al. | |

(Continued)

FOREIGN PATENT DOCUMENTS

WO 03069447 8/2003

*Primary Examiner* — Seung Lee
(74) *Attorney, Agent, or Firm* — Carter, Deluca, Farrell & Schmidt, LLP

(57) ABSTRACT

An airport baggage handling system is described for transferring baggage between airport passenger stations and aircraft loading zones. The airport baggage handling system includes in-line screening devices including at least one high resolution or high risk screening device and at least one low resolution or low risk screening device. Each piece of checked baggage is provided with a tag including, inter alia, information regarding the security status of the piece of baggage. A computer control system for controlling operation of the baggage handling system uses the information regarding the security status of the piece of baggage to selectively route the piece of baggage through one of the high and low risk scanning devices. In one embodiment, the security status of the baggage is derived from the security status of the passenger associated with the baggage.

18 Claims, 3 Drawing Sheets

(56) References Cited

U.S. PATENT DOCUMENTS

| | | | |
|---|---|---|---|
| 2005/0193648 A1* | 9/2005 | Klein | B64F 1/368 52/174 |
| 2007/0286338 A1 | 12/2007 | Sykes et al. | |
| 2013/0336447 A1 | 12/2013 | Morton | |
| 2014/0291405 A1* | 10/2014 | Harkes | G06K 19/0716 235/492 |

* cited by examiner

AIRPORT BAGGAGE HANDLING SYSTEM

TECHNICAL FIELD

The present disclosure relates to airport baggage handling systems and, more particularly, to airport baggage handling systems including in-line baggage screening devices.

BACKGROUND

Baggage handling systems for transferring baggage from passenger check-in stations to aircraft loading zones to facilitate placement of the baggage on aircraft are well known. Typically, airport baggage handling systems include screening devices to check the baggage for contraband, e.g., explosives, drugs, weapons, etc. In some baggage handling systems, baggage is manually fed through a screening device and, subsequently, manually placed onto a conveyor of the baggage handling system. In other baggage handling systems, the screening device is provided in-line with the baggage handling system.

Currently, when a passenger checks in to board a flight, transportation security authorities (TSA) designate certain passengers as high risk and others as low risk. This information is forwarded to the airlines via communication between the TSA and the airlines. Passengers designated unknown or high risk and their unchecked or carry-on baggage are subjected to more strict and time consuming searches, whereas passengers designated low risk are allowed to pass through the airport check points more quickly under less scrutiny. See, e.g., U.S. Pat. No. 7,702,068. This allows a majority of passengers, i.e., the low risk passengers, to move quickly through the check-in process to their respective gates for boarding.

All hold baggage, i.e., checked baggage, to be transported by an aircraft must pass through a screening device. This procedure can be time consuming and inefficient. A system and method for expediting this procedure is desired.

SUMMARY

An airport baggage handling system is described which includes a screening station having a first in-line screening device configured to perform high risk screening of baggage and a second in-line screening device configured to perform low risk screening of baggage. The airport baggage handling system includes a first transport system configured to transport baggage from an initial location to the screening station and a second transport system configured to transport baggage from the screening station to a second location. A tag is secured to each piece of baggage. The tag and/or the computer control system stores information pertaining to each piece of baggage. A computer control system is adapted to control routing of baggage along the airport baggage handling system, wherein the computer control system controls the first transport system to direct each piece of baggage to a selected one of the first or second in-line screening device based upon the information.

In embodiments, the information pertaining to the piece of baggage relates to a security status of the piece of baggage. In certain embodiments, the information relates to a security status of a passenger associated with the piece of baggage.

In embodiments, the airport baggage handling system further includes a scanning device which is in communication with the computer control system and is configured to read the information stored on the tag attached to each piece of baggage.

In embodiments, the tag includes a bar code and the scanning device is configured to read the information from the bar code. In other embodiments, the tag includes an RFID and the scanning device is configured to read the information off of the RFID.

In certain embodiments, the initial location is an airport check-in station and the second location is an aircraft loading zone.

A method of handling baggage at an airport includes is also described which includes accepting baggage from passengers at check-in stations; providing information pertaining to the piece of baggage; transporting each piece of baggage from the check-in station to a screening station having a plurality of screening devices including at least one high risk screening device and at least one low risk screening device; directing each piece of baggage to a selected one of the plurality of screening devices based upon the information; transporting cleared baggage from the screening devices to an airport loading zone; and routing suspect baggage from the screening devices to a further inspection station.

In embodiments, providing the identifying information on each piece of baggage includes storing the information on a barcode attached to each piece of baggage. In other embodiments, providing identifying information on each piece of baggage includes storing the information on an RFID tag secured to each piece of baggage.

In embodiments, providing information on each piece of baggage includes storing the information on a tag supported on each piece of baggage.

In some embodiments, the information is related to the security status of the piece of baggage. In other embodiments, the information relates to the security status of the passenger associated with the baggage.

In embodiments, the information pertaining to each piece of baggage identifies each piece of baggage as high risk baggage or low risk baggage and the step of directing each piece of baggage to a selected one of the plurality of screening devices includes directing the high risk baggage to a high risk screening device and directing the low risk baggage to a low risk screening device.

In embodiments, providing information pertaining to each piece of baggage includes storing the information on the computer control system.

In certain embodiments, the method further includes determining the timeliness of the baggage including determining whether the baggage is on-time, early or late; checking whether or not the selected one of the plurality of security devices is available; directing late baggage to the selected one of the plurality of security devices; directing the on-time and early baggage identified as low risk baggage to the at least one low risk screening device if the at least one low risk screening device is available; and directing the on-time and early baggage designated as low risk baggage to a pre-screening buffering station if the at least one low risk screening device is unavailable.

In certain embodiments, the method further includes directing the on-time and early baggage designated as high-risk baggage to the at least one high risk screening device. Alternately, the method further includes directing the on-time and early baggage designated as high risk baggage to the pre-screening buffering device.

An airport baggage handling system is also described which includes a screening station having a first in-line screening device configured to perform high risk screening of baggage and a second in-line screening device configured to perform low risk screening of baggage. A first transport system is configured to transport baggage from an airport check-in station to the screening station and a second transport system configured to transport baggage from the screening station to an aircraft loading zone. A computer control system is adapted to control routing of baggage along the airport baggage handling system. A tag is secured to each piece of baggage. The tag and/or the computer control system stores information pertaining to the security status of a passenger associated with each piece of baggage. The computer control system is adapted to control the first transport system to direct each piece of baggage to a selected one of the first or second in-line screening devices based upon the information.

BRIEF DESCRIPTION OF DRAWINGS

The accompanying drawings, which are incorporated in and constitute a part of this specification, illustrate embodiments of the disclosure and, together with a general description of the disclosure given above and the detailed description of the embodiments given below, serve to explain the principles of the disclosure, wherein.

DETAILED DESCRIPTION OF EMBODIMENTS

Embodiments of the presently disclosed baggage handling system will now be described in detail with reference to the drawings wherein like numerals designate identical or corresponding elements in each of the several views. As used herein, the term screening device includes any device for detecting contraband, e.g., explosives, drugs, weapons, etc., within baggage including X-ray transmission imaging, radiographic imaging, computer tomography (CT) scanners, metal detectors, chemical sniffers, etc.

The present disclosure is directed to baggage handling systems which are configured to maximize baggage throughput between airline check-in stations and aircraft loading zones. In the presently disclosed baggage handling system, a level of risk associated with each piece of baggage is identified. Thereafter, this information is used to direct each piece of baggage to a suitable in-line screening device. By identifying the threat level associated with each piece of baggage, lower risk baggage can be expedited through the screening process while higher risk baggage can be scrutinized more carefully.

Known screening devices are operable in a low resolution mode and a high resolution mode. In the low resolution mode, baggage is screened at a basic level to identify obvious threats. In the high resolution mode, baggage is screened more thoroughly to provide a more detailed image of the contents of the baggage. In-line screening devices can be used to screen lower risk baggage as well as higher risk baggage by transitioning the screening device between a high resolution mode and its low resolution mode. However, the transition of a screening device between modes may take a substantial amount of time, e.g., five or ten seconds.

During the transition time, the screening device would be inactive and the flow of baggage through the screening device would be interrupted. Thus, in order to expedite flow throughput between the airline check-in station and the aircraft loading zone, the present baggage handling system includes at least one high resolution or high risk screening device for screening high risk baggage and at least one low resolution or low risk screening device for screening low risk baggage. By providing such a system, low risk baggage can be more quickly moved through the screening process while maintaining continuous throughput through both the high and low resolution screening devices.

Figure 1:
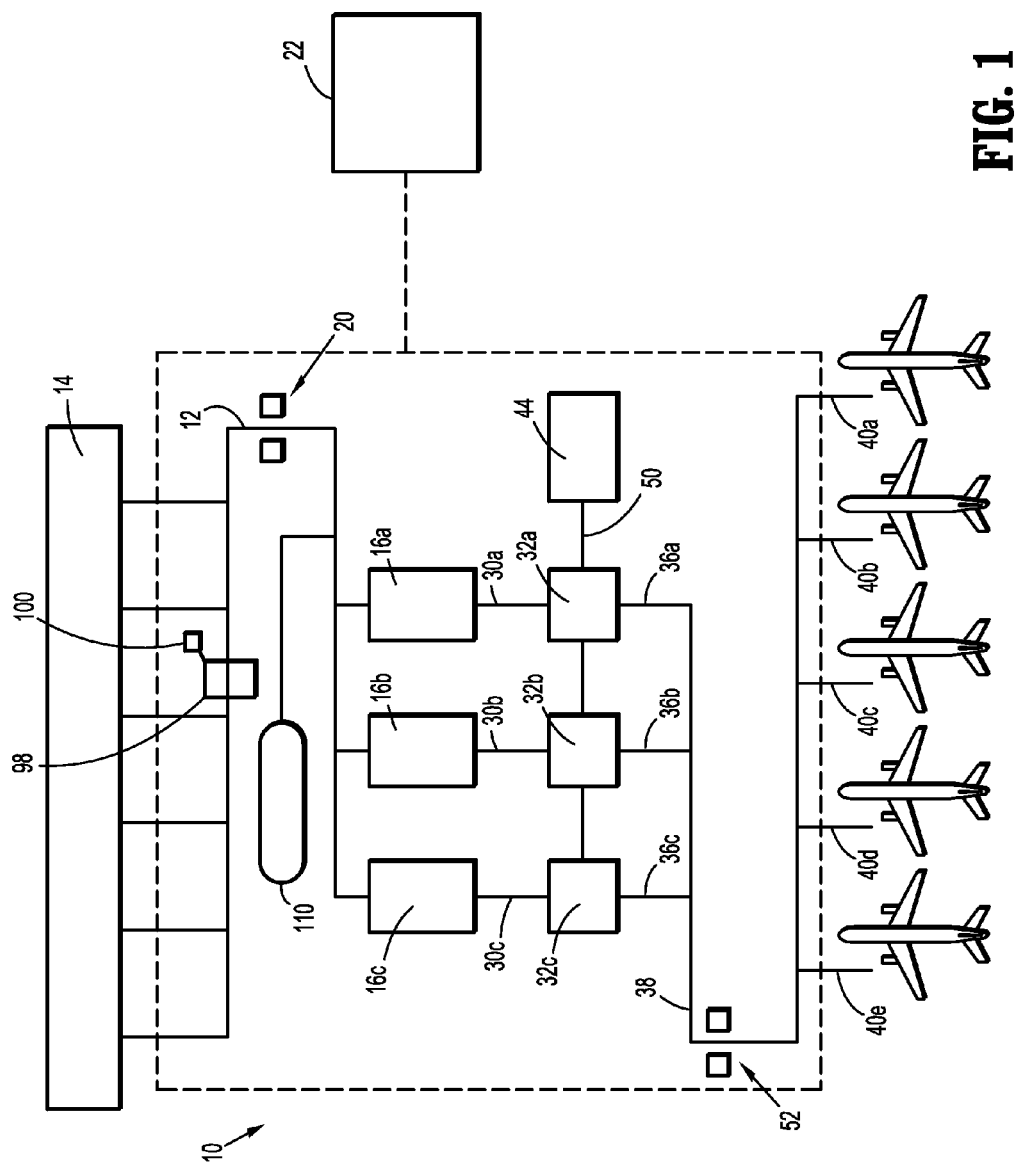
FIG. 1 is a schematic view of the presently disclosed baggage handling system.

FIG. 1 illustrates a schematic view of one embodiment of the presently disclosed baggage handling system shown generally as 10. Baggage handling system 10 includes a first transport system 12 which is positioned between passenger check-in stations 14 and a screening station 16. The check-in stations 14 can include manned desks in which an attendant checks each piece of baggage or an automated kiosk wherein the passenger self-checks and delivers each piece of baggage to the first transport system 12. The first transport system 12 can include any known conveyor suitable for transporting baggage including, e.g., a belt type conveyor.

In one embodiment, each piece of baggage 98 includes a tag 100, which may be in the form of a barcode or radio frequency identification ("RFID") or other readable identification device onto which information can be stored. When the pieces of baggage are checked, a tag 100 is provided on each piece of baggage which includes information about the piece of baggage such as, passenger identification and destination. The security status or risk level assigned to each piece of baggage may also be provided on the tag 100. In the alternative, the security status or risk level assigned to each piece of baggage 98 can be input directly into a computer control system 22 in addition to or independently of the tag 100 as will be discussed in further detail below.

The first transport system 12 also includes scanning devices 20 positioned along its length which continuously read the tags 100 as the pieces of baggage 98 move along the first transport system 12. The scanning devices 20 communicate with the computer control system 22 which uses data read from the tags 100 and/or input into the memory of the computer control system 22 to properly route the pieces of baggage 100 through the baggage handling system 10 as will be discussed in detail below.

The screening station 16 includes a plurality of screening devices 16a-16c which are positioned to receive baggage from the first transport system 12. At least one of the screening devices, e.g., screening device 16a, is a high resolution or high risk screening device and at least one screening device is a low resolution or low risk screening device, e.g., 16b and 16c. When a piece of baggage is directed to the screening station 16, the computer control system 22 will identify what the threat level associated with the piece of baggage is by reading the tag 100. This information is used by the computer control system 22 to properly route the piece of baggage through the security station 16. More specifically, if the risk level or security status of the piece of baggage is high, the computer control system 22 will route the piece of baggage through the high risk screening device 16a and if the security status for the piece of baggage is low, the computer control system 22 will route the piece of baggage through a low resolution screening device 16b or 16c.

When a piece of baggage passes through one of the screening devices 16a-16c, the screening device 16a-16c will send a signal to the computer control device 22 that the piece of baggage has been cleared, i.e., that the piece of baggage does not include contraband, or that the piece of baggage is suspect, i.e., there is some question whether the piece of baggage includes contraband. Cleared pieces of baggage are transported from one of the screening devices 16a-16c by an intermediate conveyor 30a-30c, through a switching device 32a-32c, along an exit conveyor 36a-36c and onto a second transport system 38 for transport to an aircraft loading zone 40a-40e. Suspect pieces of baggage are routed to a further inspection station 44 via one of the intermediate conveyors 30a-30c, one of the switching devices 32a-32c and an inspection station conveyor 50. The computer control system 22 controls operation of the switching devices 32a-32c based upon the signal received from the screening devices 16a-16c to properly route the pieces of baggage from the screening devices 16a-16c to either the aircraft loading zones 40a-40e or the further inspection station 44.

The further inspection station 44 can be a manual search station in which the piece or pieces of baggage are opened and manually inspected for contraband. Alternatively, a more sophisticated electronic screening device can be used to provide further baggage screening. Suspect baggage which is subsequently cleared can be returned to the second transport system 38 for delivery to an aircraft loading zone 40a-40e. As discussed above with respect to the first transport system 12, the second transport system 38 also includes scanning devices 52 which read the tag 100 of each piece of baggage and forward this information to the computer control system 22. This allows the computer control system 22 to properly route each piece of baggage to the correct aircraft loading zones 40a-40e. The second transport system 38 includes a sortation section to facilitate delivery to one of multiple aircraft loading zones 40a-40e.

As discussed above, the security status or risk level of each piece of baggage is provided on the tag 100 of the baggage. In an embodiment, each piece of baggage is assigned the security status of the passenger checking the piece of baggage. More specifically, prior to an airline passenger checking onto a flight, the TSA may assign the passenger a risk profile. For example, the TSA may deem passenger who has been previously screened a low risk and a passenger who is marked by a security agency or who is unknown to the system a high risk. In the presently disclosed baggage handling system, each piece of baggage can be assigned the same security status or risk level as the passenger who checked the baggage.

When baggage in the baggage handling system is separated and routed based upon its threat level, the flow of baggage through the system will increase. Thus, a baggage handling system requiring a certain throughput can reach the desired throughput with fewer screening devices to reduce cost.

Although FIG. 1 illustrates the baggage handling system 10 as having three screening devices including one high resolution or high risk screening device 16a and two low resolution or low risk screening devices 16b and 16c, the exact number of screening devices required will depend on the intended baggage capacity of the system 10 and may include multiple high and low resolution screening devices.

Because screening devices can transition between a low resolution mode and a high resolution mode, it is possible to vary the routing of baggage based upon existing circumstances. For example, when a high risk screening device becomes unavailable, another screening device can be transitioned to take over for the unavailable screening device. In addition, it is also possible to dynamically increase or reduce the number of high or low risk screening machines based on the predicted percentage of high risk baggage in the baggage flow.

Figure 2:
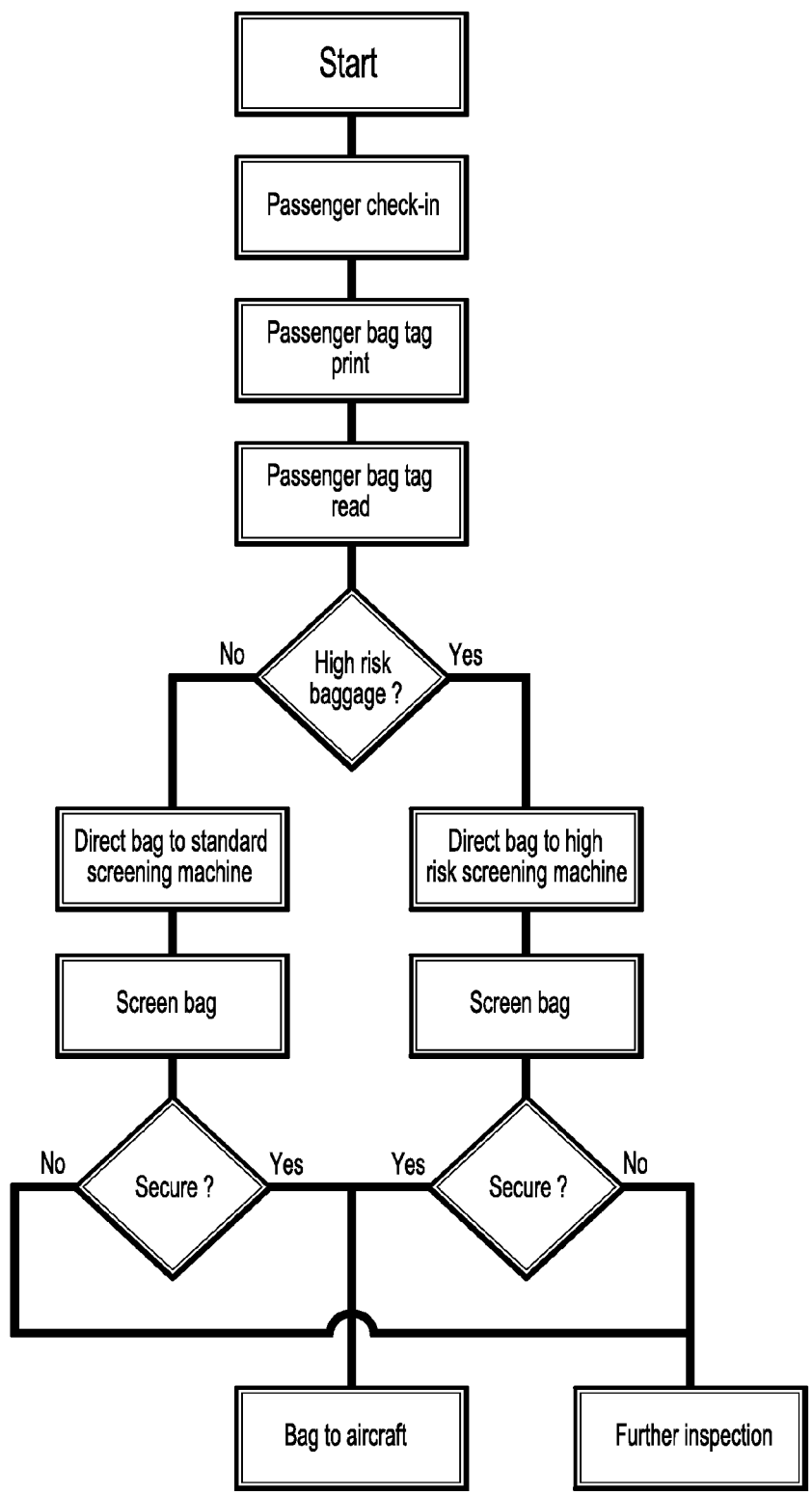
FIG. 2 is a flow chart illustrating method steps for operating the presently disclosed baggage handling system.

Referring also to FIG. 2, FIG. 2 illustrates a flow chart illustrating the method for routing a piece of baggage through the baggage handling system 10. As shown, the process begins when a passenger checks in at the airline check-in desk or kiosk. During the check-in process, information including security status is loaded onto a tag and the tag is attached to a respective piece of baggage. The piece of baggage is placed on the first transport system 12 and conveyed towards the screening station 16. As the piece of baggage approaches the screening station 16, the tag 100 is read by a scanning device 20 and this information is translated to the computer control system 22. Based upon the security status of the piece of baggage, the computer control system 22 directs the piece of baggage to either a high risk screening device 16a or a low risk screening device 16b or 16c.

When the piece of baggage passes through a respective screening device 16a-16c, the baggage is determined to be clear or suspect. This information is translated to the computer control system 22. If the baggage is determined to be clear, the computer control system 22 operates a switching device 32a-32c to route the baggage towards one of the aircraft loading zones 40a-40e via the second transport system 38. If the baggage is determined to be suspect, the baggage is routed to the further inspection station 44 via a switching device 32a-32c. As discussed above, scanning devices 52 are provided along the second transport system 38. The scanning device 52 translates information regarding destination to the computer control system 22 to facilitate routing of the baggage to the correct aircraft loading station 40a-40e.

Figure 3:
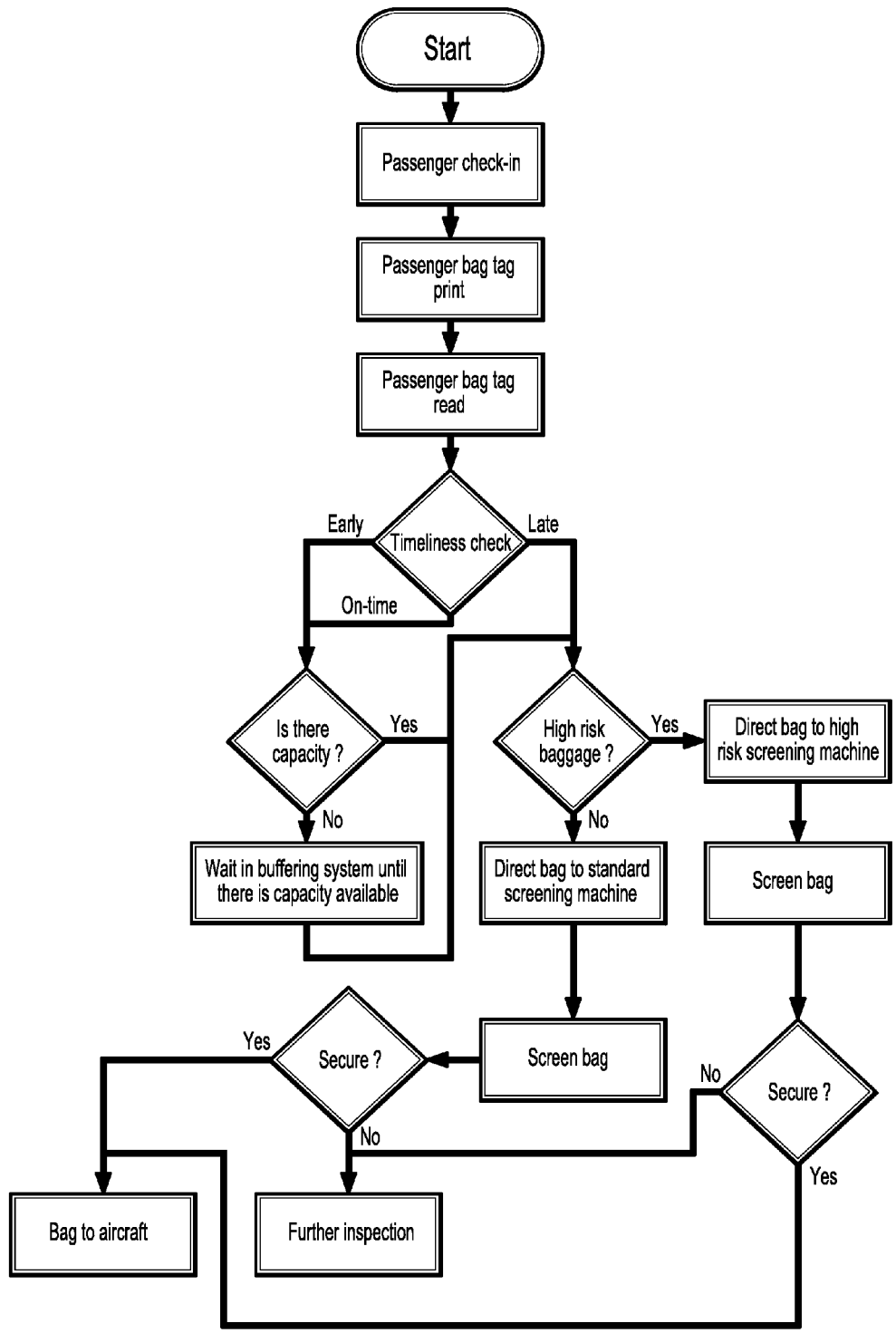
FIG. 3 is a flow chart illustrating alternate method steps for operating the presently disclosed baggage handling system.

FIG. 3 is a flow chart illustrating an alternative embodiment of the method for routing a piece of baggage through the baggage handling system 10. The flow chart is identical to the flow chart shown in FIG. 2 but further includes a timeliness check. More specifically, information regarding the timeliness of the aircraft onto which each piece of baggage 98 is to be loaded is retained in the computer control system 22. Before each piece of baggage 98 is directed to the security station 16, the computer control system 22 determines whether the baggage is late, e.g., the aircraft is leaving in less than one hour, on-time, e.g., the aircraft is leaving in less than ninety minutes, or early, e.g., the aircraft is leaving in more than ninety minutes. If the baggage 98 is determined to be late and expedited transport is required, the computer control system 22 routes the baggage directly to the appropriate high or low risk in-line screening device of security station 16. If the baggage 98 is determined to be on-time or early, the computer control system 22 routes the baggage 98 to the appropriate in-line high or low risk screening device if an appropriate screening device is available. If an appropriate screening device is unavailable, then the baggage 98 is directed to a pre-screening buffering station 110 until the capacity of the security station 16 becomes available. The appropriate screening device may be deemed unavailable when the appropriate screening device is operating at ninety (90) percent capacity.

In an alternate embodiment of the method for routing a piece of baggage 98 through the baggage handling system 10 discussed above with respect to FIG. 3, baggage 98 which is designated as on-time or early as well as high risk (or unknown) baggage is routed directly to a high resolution or high risk screening device. Routing the high risk (or unknown) baggage 98 directly to the high resolution or high risk screening device, despite being designated early or on-time, allows more time for the high risk baggage to be processed.

It is contemplated that individual features of the above described embodiments may be combined without departing from the scope of the present disclosure. Although the illustrative embodiments of the present disclosure have been described herein with reference to the accompanying drawings, the above description, disclosure, and figures should not be construed as limiting, but merely as exemplifications of particular embodiments. It is to be understood, therefore, that the disclosure is not limited to the precise embodiments described herein, and that various other changes and modifications may be effected by one skilled in the art without departing from the scope or spirit of the present disclosure.

The invention claimed is:

1. An airport baggage handling system comprising:
   a screening station including a first in-line screening device configured to perform high risk screening of baggage and a second in-line screening device configured to perform low risk screening of baggage;
   a first transport system configured to transport baggage from an initial location to the screening station;
   a second transport system configured to transport baggage from the screening station to a second location;
   a computer control system adapted to control routing of baggage along the airport baggage handling system;
   a tag secured to each piece of baggage;
   wherein the tag, and/or the computer control system storing information pertaining to each piece of baggage, the computer control system being adapted to control the first transport system to direct each piece of baggage to a selected one of the first or second in-line screening devices based upon the information.

2. The airport baggage handling system of claim 1, wherein the information relates to a security status of each piece of baggage.

3. The airport baggage handling system of claim 1, wherein the information relates to a security status of a passenger associated with each piece of baggage.

4. The airport baggage handling system of claim 1, further including a scanning device in communication with the computer control system, the scanning device being configured to read data stored on the tag attached to each piece of baggage.

5. The airport baggage handling system of claim 4, wherein the tag includes a bar code and the scanning device is configured to read data from the bar code.

6. The airport baggage handling system of claim 4, wherein the tag includes an RFID and the scanning device is configured to read data off the RFID.

7. The airport baggage handling system of claim 1, wherein the initial location is an airport check-in station and the second location is an aircraft loading zone.

8. A method of handling baggage at an airport comprising:
   accepting baggage from passengers at check-in stations;
   providing information pertaining to each piece of baggage;
   transporting each piece of baggage from the check-in station to a screening station having a plurality of screening devices including at least one high risk screening device and at least one low risk screening device;
   directing each piece of baggage to a selected one of the plurality of screening devices based upon the information;
   transporting cleared baggage from the screening devices to an airport loading zone; and
   routing suspect baggage from the screening devices to a further inspection station;
   wherein the information pertaining to each piece of baggage identifies each piece of baggage as high risk baggage or low risk baggage and wherein directing each piece of baggage to a selected one of the plurality of screening devices includes directing the high risk baggage to the at least one high risk screening device and directing the low risk baggage to the at least one low risk screening device.

9. The method of claim 8, wherein providing information pertaining to each piece of baggage includes storing the information on a barcode attached to each piece of baggage.

10. The method of claim 9, wherein the information relates to the security status of the passenger associated with each piece of baggage.

11. The method of claim 8, wherein providing information pertaining to each piece of baggage includes storing the information on an RFID tag secured to each piece of baggage.

12. The method of claim 8, wherein providing information pertaining to each piece of baggage includes storing the information on a tag supported on each piece of baggage.

13. The method of claim 8, wherein the information is related to the security status of each piece of baggage.

14. The method of claim 8, wherein providing the information pertaining to each piece of baggage includes storing the information in the computer control system.

15. The method of claim 8, further including determining the timeliness of the baggage including determining whether the baggage is on-time, early or late;
   checking whether or not the selected one of the plurality of screening devices is available;
   directing late baggage to the selected one of the plurality of screening devices;
   directing the on-time and early baggage identified as low risk baggage to the at least one low risk screening device if the at least one low risk screening device is available; and
   directing the on-time and early baggage designated as low risk baggage to a pre-screening buffering station if the at least one low risk screening device is unavailable.

16. The method of claim 15, further including directing the on-time and early baggage designated as high-risk baggage to the at least one high risk screening device.

17. The method of claim 15, further including directing the on-time and early baggage designated as high risk baggage to a pre-screening buffering device.

18. An airport baggage handling system comprising:
   a screening station including a first in-line screening device configured to perform high risk screening of baggage and a second in-line screening device configured to perform low risk screening of baggage;
   a first transport system configured to transport baggage from an airport check-in station to the screening station;
   a second transport system configured to transport baggage from the screening station to an aircraft loading zone;
   a computer control system adapted to control routing of baggage along the airport baggage handling system;
   a tag secured to each piece of baggage;
   wherein the tag, and/or the computer control system stores information pertaining to the security status of a passenger associated with each piece of baggage, the computer control system being adapted to control the first transport system to direct each piece of baggage to a selected one of the first or second in-line screening devices based upon the information.

* * * * *